United States Patent
Faust et al.

(10) Patent No.: US 7,477,176 B2
(45) Date of Patent: Jan. 13, 2009

(54) METHOD AND APPARATUS FOR GENERATING MULTIPLE ANALOG SIGNALS USING A SINGLE MICROCONTROLLER OUTPUT PIN

(75) Inventors: Robert Allan Faust, Highlands Ranch, CO (US); John Daniel Upton, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 711 days.

(21) Appl. No.: 11/191,641

(22) Filed: Jul. 28, 2005

(65) Prior Publication Data

US 2007/0024326 A1 Feb. 1, 2007

(51) Int. Cl.
*H03M 1/66* (2006.01)
(52) U.S. Cl. .................. 341/144; 327/407; 327/415; 341/141; 341/152
(58) Field of Classification Search ................ 341/141, 341/152, 146; 327/415, 407
See application file for complete search history.

(56) References Cited

U.S. PATENT DOCUMENTS

| | | | |
|---|---|---|---|
| 4,361,065 A | 11/1982 | Wilcox et al. ............... 84/1.03 |
| 4,421,001 A | 12/1983 | Wilcox et al. ............... 84/1.17 |
| 5,031,088 A | 7/1991 | Tanaka ...................... 363/71 |
| 5,155,488 A * | 10/1992 | Takahashi .................. 341/144 |
| 5,181,201 A | 1/1993 | Schauss et al. ............ 370/85.1 |
| 5,416,480 A * | 5/1995 | Roach et al. ................. 341/61 |
| 5,600,634 A | 2/1997 | Satoh et al. ................ 370/294 |
| 6,169,505 B1 * | 1/2001 | Nishimura et al. ......... 341/141 |
| 6,570,517 B1 * | 5/2003 | Geraghty et al. .......... 341/141 |
| 6,621,437 B2 * | 9/2003 | Khalil et al. ............... 341/144 |
| 7,382,301 B2 * | 6/2008 | Mourrier .................... 341/152 |
| 7,385,544 B2 * | 6/2008 | Chia ......................... 341/144 |

\* cited by examiner

*Primary Examiner*—Long Nguyen
*Assistant Examiner*—Ryan C Jager
(74) *Attorney, Agent, or Firm*—Duke W. Yee; Diana L. Roberts-Gerhardt; Brandon G. Williams (57) ABSTRACT

A method and apparatus are disclosed for generating multiple separate analog signals using a single microcontroller output pin. The microcontroller generates a waveform that is used to concurrently generate multiple separate analog signals. The microcontroller outputs a waveform that includes a first signal from one of the microcontroller's output pins. The first signal is used to produce a first analog signal. The microcontroller then outputs a delineating signal, as part of the waveform, from the microcontroller's output pin. The delineating signal indicates the start of a next signal in the waveform. The microcontroller then outputs a second signal, as part of the waveform, from its output pin. The second signal is used to produce a second analog signal. The waveform includes the first signal that is followed by the delineating signal that is followed by the second signal.

1 Claim, 9 Drawing Sheets

FIG. 1
(PRIOR ART)

25% PWM
90% PWM
50% PWM

METHOD AND APPARATUS FOR GENERATING MULTIPLE ANALOG SIGNALS USING A SINGLE MICROCONTROLLER OUTPUT PIN

BACKGROUND OF THE INVENTION

1. Field of the Invention:

The present invention is directed to data processing systems. More specifically, the present invention is directed to a method and apparatus for generating multiple analog signals using a single microcontroller output pin.

2. Description of the Related Art:

A common task for microcontrollers is the generation of analog voltage outputs. Such outputs may be used as reference voltages to control other circuits or may be re-powered and used to control motors, servos, or other mechanical devices.

One of the most common methods for microcontroller generation of analog voltage is pulse width modulation (PWM). This method consists of driving an output pin on the microcontroller alternately high and then low. A resistor/capacitor (R/C) circuit connected to the output pins integrates the pulse train by smoothing the pulse train to a relatively stable voltage. The ratio of high cycle time to total cycle time defines the output voltage by the follow formula:

$$V(\text{out}) = [[[V(\text{output high}) - V(\text{output low})] * T(\text{high cycle})] / T(\text{total cycle})] + V(\text{output low}).$$

Figure 1:
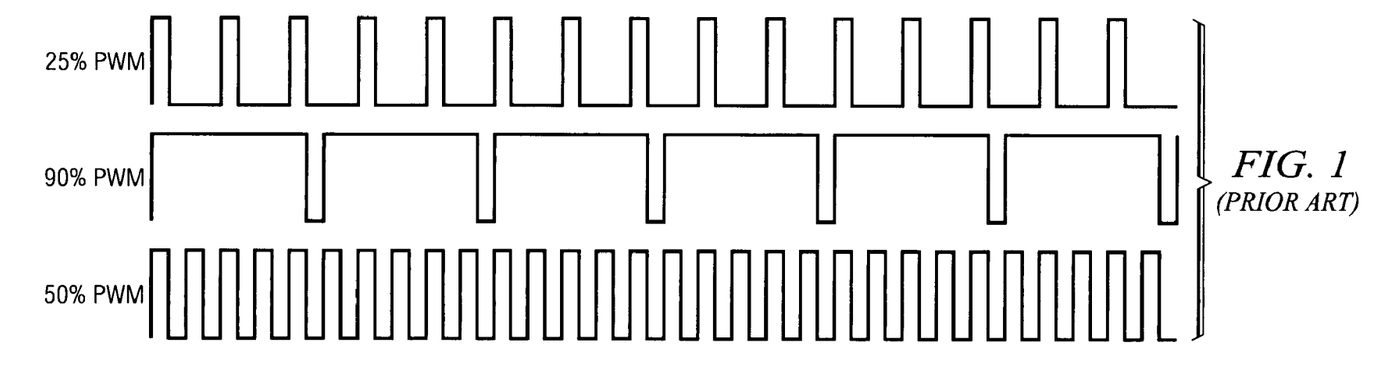
FIG. 1 depicts three examples of waveforms that each includes only a single PWM signal, which can be used to generate only a single analog voltage at a time, in accordance with the prior art.

FIG. 1 depicts three examples of waveforms that are each a single PWM waveform in accordance with the prior art. The sample waveforms represent approximately 1.35 Volts, 4.34 Volts, and 2.50 Volts, respectively, assuming an output high voltage of 4.8 Volts and output low voltage of 0.2 Volts for a typical 5 Volt CMOS microcontroller.

Each waveform can be used to generate only one analog voltage. Thus, each waveform includes only one signal that has uniform pulses throughout the entire waveform.

Figure 2:
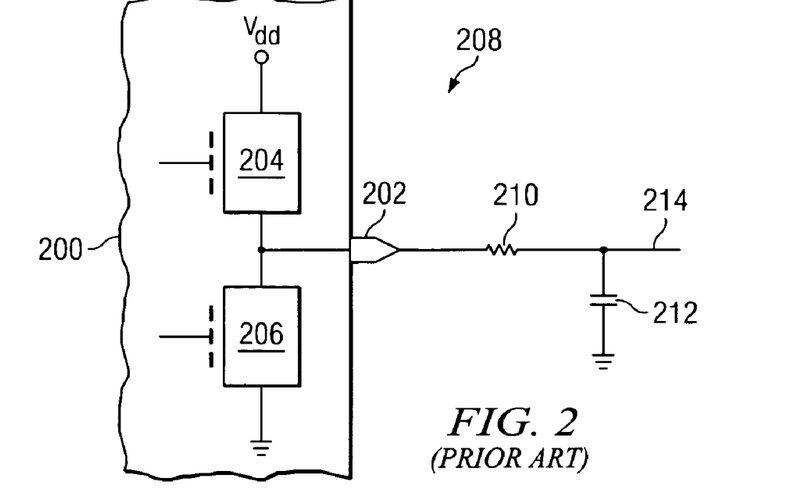
FIG. 2 illustrates a portion of a microcontroller and an external circuit for integrating a PWM waveform that is output from the microcontroller to produce an analog signal in accordance with the prior art.

FIG. 2 illustrates a portion of a microcontroller and an external circuit for integrating a PWM that is output from the microcontroller to produce an analog signal in accordance with the prior art. A portion of a microcontroller 200 is depicted. Microcontroller 200 drives output pin 202 alternatively high and low using transistors 204 and 206. As described above, a waveform, such as one of the waveforms depicted in FIG. 1, is output from pin 202. Circuit 208 includes a resistor 210 and a capacitor 212. Circuit 208 integrates the waveform received from pin 202 in order to produce a relatively stable analog voltage signal at output 214.

Instead of circuit 208, other, more accurate, forms of integration, such as operational amplifiers, could be used, as described in the prior art.

Microcontroller 200 can output only one of the waveforms of FIG. 1 using one of the pins of microcontroller 200. If all three waveforms depicted in FIG. 1 are needed, at least three different output pins of the microcontroller must be used. A separate microcontroller pin must be used for each analog signal that is needed. Thus, a dedicated microcontroller pin is required in order to produce each PWM waveform.

The usual method for generating multiple analog voltage outputs involves using a monolithic digital-to-analog (D/A) device. These are available in parallel input configurations ideal for microcontroller use but require up to nine pins for interfacing. Serial bus interface D/A devices are also available. While they can be interfaced with as few as two pins, these have the disadvantage of requiring the microcontroller to generate the appropriate bus interface signals and sometimes complex communications protocols.

Therefore, a need exists for a method and apparatus for generating a plurality of separate digital PWM signals that can each be used to generate a different analog signal by a microcontroller using a single pin and minimal programming resulting in the generation of multiple separate analog signals using the same single pin of the microcontroller.

SUMMARY OF THE INVENTION

A method and apparatus are disclosed for generating multiple separate analog signals using a single microcontroller output pin. The microcontroller generates a waveform that can be used to concurrently generate multiple separate analog signals. The microcontroller outputs a waveform that includes a first signal from one of the microcontroller's output pins. The first signal is used to produce a first analog signal. The microcontroller then outputs a delineating signal, as part of the waveform, from the microcontroller's output pin. The delineating signal indicates the start of a next signal in the waveform. The microcontroller then outputs a second signal, as part of the waveform, from its output pin. The second signal is used to produce a second analog signal. The waveform includes the first signal that is followed by the delineating signal that is followed by the second signal.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method and apparatus for concurrently generating a plurality of separate analog voltage signals by a microcontroller using only one of the microcontroller's pins. The present invention employs a trinary communications channel in which the trinary level is used during normal operation of the microcontroller as part of the waveform generation process.

The present invention provides for outputting a waveform that includes a plurality of separate digital PWM signals using only one pin on the microcontroller if the microcontroller is capable of generating three different voltage levels on a single output pin. If the microcontroller is capable of generating only two different voltage levels on a single output pin, the present invention provides for outputting a waveform that includes a plurality of separate digital PWM signals using only two pins on the microcontroller.

Each individual PWM signal, which is included in the waveform, is generated within the microcontroller in a known manner through programming of the microcontroller. The generation of a single waveform that includes these individual PWM signals time multiplexed together is not known in the prior art.

Figure 5:
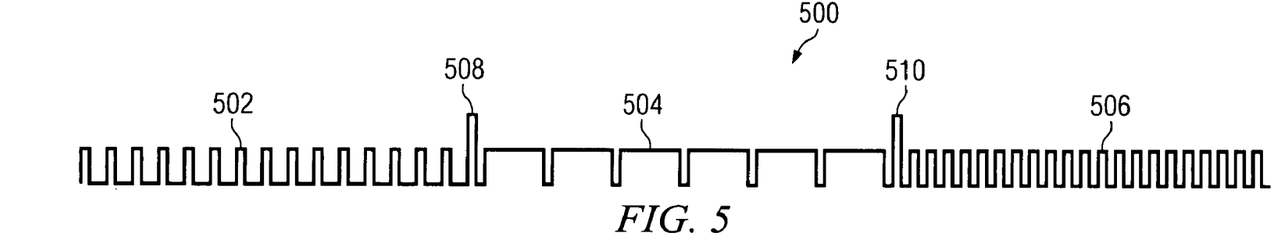
FIG. 5 is a timing diagram of a waveform that includes a plurality of digital PWM signals that have been serially time-multiplexed together within the waveform in accordance with the present invention.

For example, the generation of an individual signal, such as signal 502, signal 504, or signal 506, is known in the prior art. However, the generation of a single waveform, such as waveform 500 that includes signals 502, 504, and 506 time multiplexed together is not known in the prior art.

According to the present invention, one waveform is generated by the microcontroller that includes a series of separate PWM signals. Each PWM signal is time multiplexed onto a single output pin of the microcontroller. Each digital PWM signal is bounded, or delineated, within the waveform, by a trinary control pulse also generated by the microcontroller.

Therefore, according to the present invention, one waveform is generated by a microcontroller. To produce the waveform, the microcontroller first outputs a first digital PWM signal. This first digital PWM signal is then followed by at least one first trinary pulse. This first trinary pulse indicates that a next PWM signal is about to be generated. After the microcontroller outputs the first trinary pulse, the microcontroller then outputs a second digital PWM signal. This second digital PWM signal will preferably be of a frequency that is different from the first PWM signal although the frequencies may be the same. At least one second trinary pulse is then output by the microcontroller. This at least one second trinary pulse indicates that a third PWM signal is about to be generated. This process continues whereby a plurality of separate digital PWM signals are output from the microcontroller, each one separated from the next one by at least one trinary pulse.

If the microcontroller does not directly support trinary logic outputs and cannot produce trinary logic outputs, i.e. cannot produce three different voltages on the same output pin, the additional signal level is generated using a second microcontroller output pin. In this configuration, one pin generates the sequential digital PWM output signals of the waveform and the other pin is used to insert the trinary control pulses into the waveform.

True trinary logic, which is base 3 rather than base 2, is used for the multiplexing of the plurality of digital PWM and the trinary control pulses into the single waveform. Three distinct logic levels are involved. A 0 Volt output is a logical 0. A 5 Volt output is a logical 1. A 6 Volt output, for example, is a logical 2. The trinary state logic used herein is not to be confused with "tri-state" logic which uses high impedance output control which does not denote a particular logical value.

Figure 3:
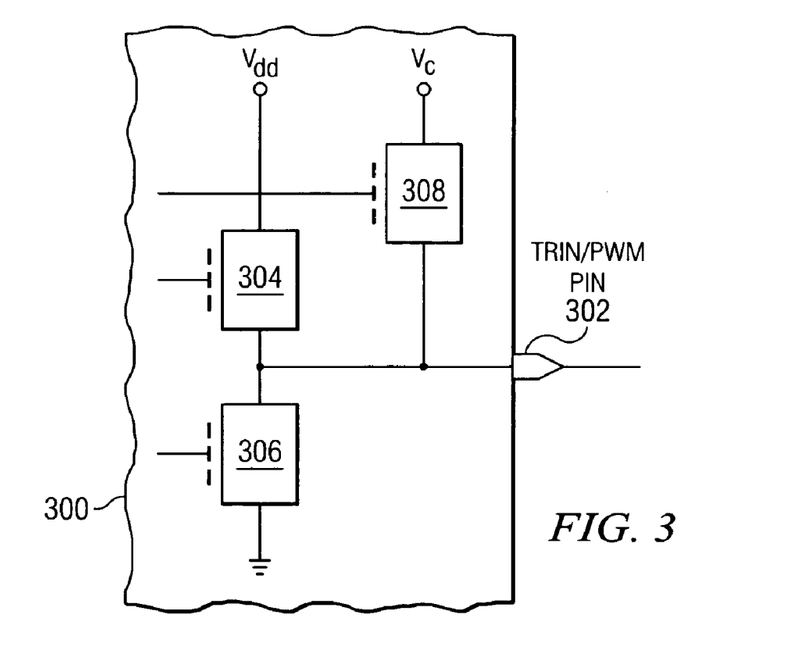
FIG. 3 depicts a portion of a microcontroller, which is capable of outputting trinary states, i.e. three different voltage levels, on a single output pin, that outputs a waveform that includes a plurality of different, separate PWM signals using a single one of the microcontroller's pins in accordance with the present invention.

FIG. 3 depicts a portion of a microcontroller, which is capable of outputting trinary states on a single output pin, that outputs a waveform that includes a plurality of different PWM signals using a single one of the microcontroller's pins in accordance with the present invention. Microcontroller 300 drives output pin 302 alternatively high and low using transistors 304 and 306. Thus, microcontroller 300 is capable of outputting via pin 302 a first voltage level, which is the low voltage level, and a second voltage level, which is the high voltage level, using transistors 304 and 306. In an ideal circuit, the high voltage level would be Vdd while the low voltage would be ground, or zero volts.

Microcontroller 300 is also capable of producing trinary signals. Therefore, microcontroller 300 includes a transistor 308 that is used to drive pin 302 to a third voltage level. In an ideal circuit, the third voltage level would be Vc. Thus, the microcontroller can output a third voltage level on pin 302 using transistor 308. Pin 302 is referred to herein as the TRIN/PWM Pin to indicate that the single pin is used to output both the trinary logic level pulses and the various separate PWM signals.

When the microcontroller that is used in the present invention is capable of outputting three different voltage levels using a single microcontroller pin, the present invention can be implemented using only one microcontroller pin. Any number of analog signals can be generated from a single waveform, output from this single pin, that includes a plurality of digital PWM signals delineated by trinary control pulses. For this type of microcontroller, only one microcontroller pin is needed to concurrently generate any number of analog signals.

Figure 4:
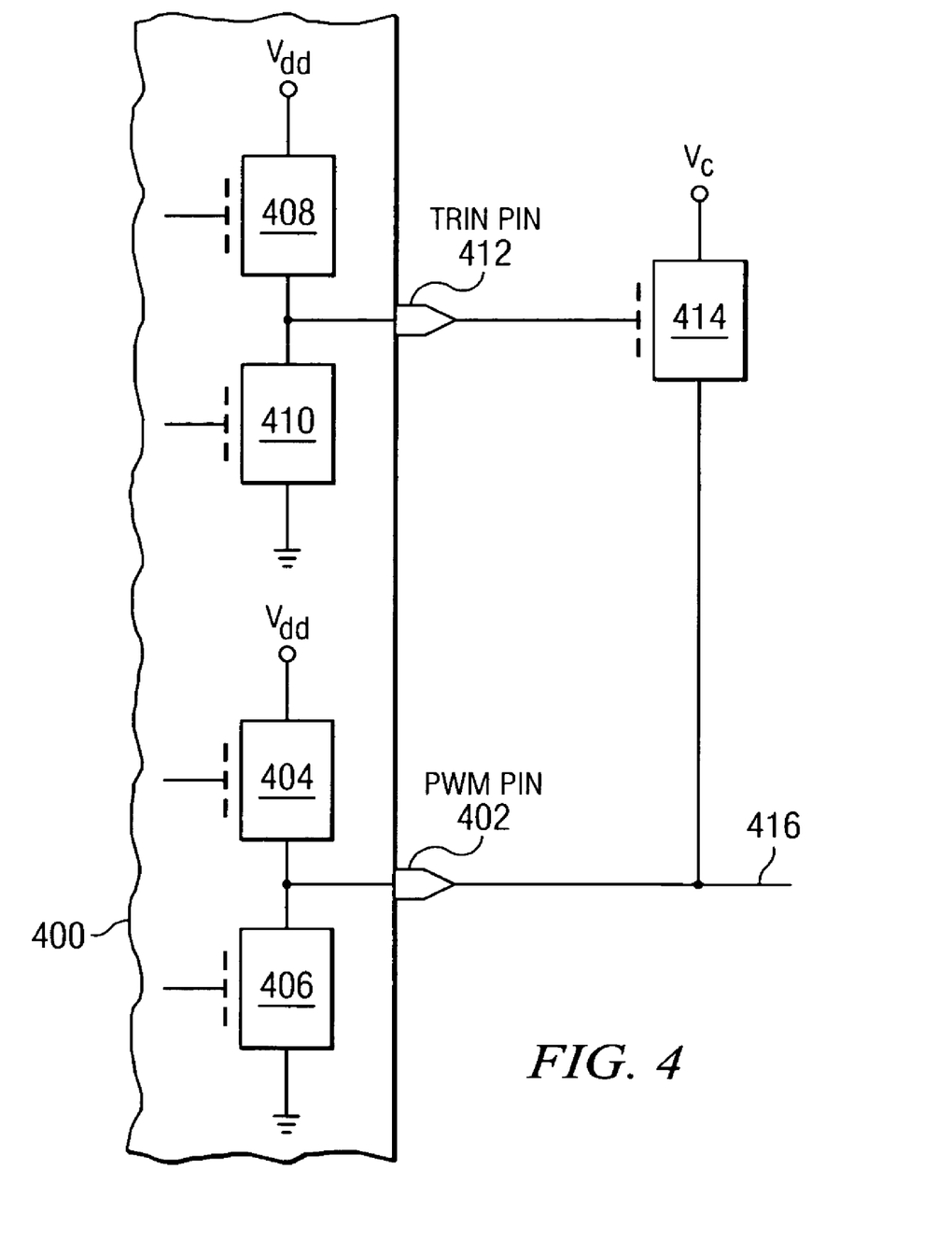
FIG. 4 depicts a portion of a microcontroller, which is capable of outputting two voltage levels on a single output pin, that outputs a waveform that includes a plurality of different, separate PWM signals using only two of the microcontroller's pins in accordance with the present invention.

The present invention can also be implemented using microcontrollers that are not capable of outputting three different voltage levels using a single microcontroller pin. When this type of microcontroller is used, an external circuit is needed in order to produce the third voltage level. FIG. 4 depicts a portion of a microcontroller, which is capable of outputting two voltage levels on a single output pin, that outputs a waveform that includes a plurality of different PWM signals using only two of the microcontroller's pins in accordance with the present invention.

Microcontroller 400 drives output pin 402 (PWM Pin) alternatively high and low using transistors 404 and 406. Thus, microcontroller 400 is capable of outputting via pin 402 a first voltage level, which is the low voltage level, or a second voltage level, which is the high voltage level, using transistors 404 and 406.

Pin 412 (TRIN Pin) is used to generate the trinary control signal. Pin 412 is connected to the control gate of transistor 414. Transistor 414 is connected between Vc, which is the trinary logic voltage, and pin 402, which is the pin used for the PWM signal generation.

Microcontroller 400 generates a waveform 416 that includes separate PWM signals that are multiplexed together and delineating trinary signals. The separate PWM signals are generated by pin 402 and the delineating trinary signals are generated by pin 412.

Microcontroller 400 is not capable of producing trinary signals using a single output pin. Therefore, an external circuit, i.e. transistor 414, is used to produce the third voltage level that is inserted into the waveform that is output from pin 402. Transistors 408 and 410 produce an output signal via pin 412. This signal is then used to drive transistor 414. When the signal being output from pin 412 is high, a third voltage level is inserted into the output signal 416. When the signal being output from pin 412 is low, output signal 416 includes only the PWM signal that is currently being output from pin 402.

Pin 402 is referred to herein as the PWM Pin to indicate that this pin is used to output the PWM signals. Pin 412 is referred to herein as the TRIN Pin to indicate that this pin is used to occasionally insert the trinary logical level pulses into the waveform 416.

Other components, not shown, may be present in this external circuit to protect pin 402 from the higher voltage if it is not specified as being higher voltage tolerant.

When the microcontroller that is used in the present invention is not capable of outputting three different voltage levels using a single microcontroller pin, the present invention is implemented using only two microcontroller pins. Any number of analog signals can be generated from a single waveform that includes a plurality of digital PWM signals delineated by trinary control pulses. For this type of microcontroller, only two microcontroller pins are needed to generate any number of analog signals.

FIG. 5 is a timing diagram of a waveform 500 that includes a plurality of separate PWM signals serially time multiplexed together in accordance with the present invention. In the example depicted by FIG. 5, there are three separate digital PWM signals being serially time-multiplexed into a single waveform 500. Although FIG. 5 depicts waveform 500 including three signals that are serially time-multiplexed, waveform 500 could include any number of separate PWM signals that are serially time multiplexed together.

With the appropriate programming described below, either microcontroller 300 and its TRIN/PWM pin 302, or microcontroller 400 and its TRIN pin 412, PWM pin 402, and transistor 414 can be used to generate the waveform depicted in FIG. 5.

Waveform 500 includes sequential digital PWM signals with embedded trinary control pulses. The trinary control pulses serve to signal to the voltage de-multiplexing logic that a next separate PWM signal is about to be presented.

Waveform 500 includes a first PWM signal 502, a second PWM signal 504, and a third PWM signal 506. A trinary pulse is used to separate each PWM signal from the next PWM signal. For example, trinary pulse 508 is used to separate PWM signal 502 from PWM signal 504. Trinary pulse 508 is used as described below to indicate the start of a different PWM signal. Trinary pulse 510 is used to separate PWM signal 504 from PWM signal 506.

Figure 6:
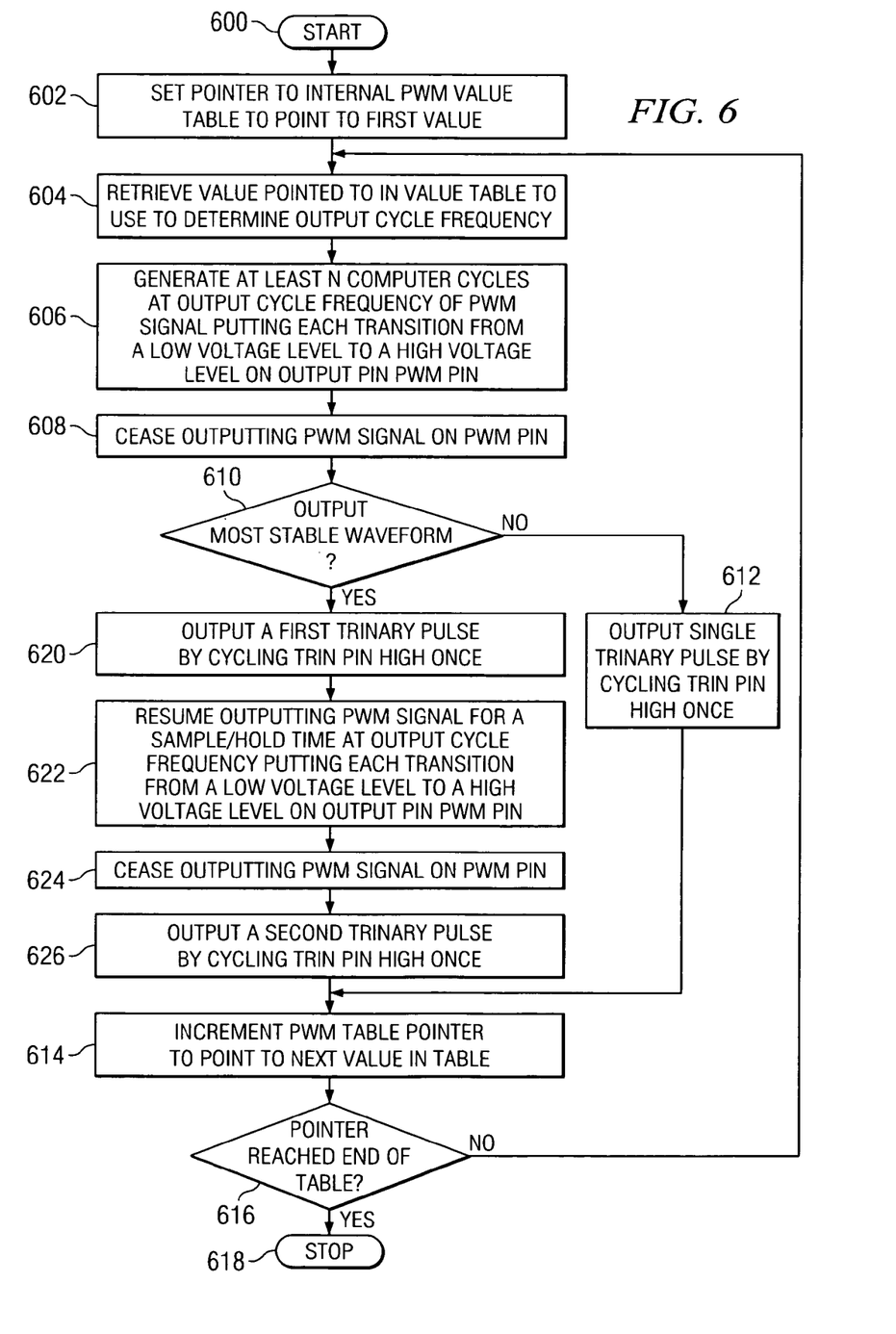
FIG. 6 depicts a high level flow chart that illustrates generating, by a microcontroller that cannot generate three different voltage levels on the same output pin, a waveform that includes a plurality of serially time-multiplexed digital PWM signals in accordance with the present invention.

FIG. 6 depicts a high level flow chart that illustrates generating, by a microcontroller that cannot generate three different voltage levels on the same output pin, a waveform that includes a plurality of serially time-multiplexed digital signals in accordance with the present invention. The process starts as depicted by block 600 and thereafter passes to block 602 which illustrates setting a pointer to an internal PWM value table to point to the first value in the table. Next, block 604 depicts retrieving the value that is currently pointed to in the value table to use to determine the output cycle frequency of the next digital PWM signal to be generated by this microcontroller.

The process then passes to block 606 which illustrates generating at least N number of computer cycles of a digital PWM signal at the output cycle frequency retrieved from the PWM value table. Each transition of the PWM signal from a low voltage value to a high voltage value is put on output PWM pin 402. Block 608, then, depicts ceasing outputting of the PWM signal on PWM pin 402.

Figure 8:
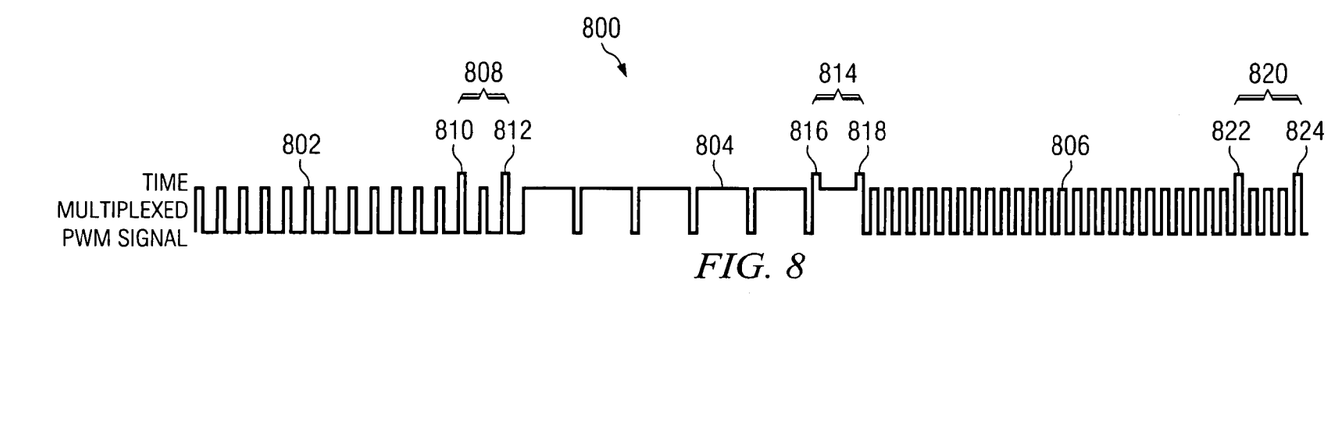
FIG. 8 is a timing diagram of a waveform that includes a plurality of serial time-multiplexed PWM signals where the waveform can be used to produce the most stable analog signals in accordance with the present invention.

The process then passes to block 610 which illustrates a determination of whether or not to output a waveform that is used to generate the most stable analog signals. An example of a waveform that produces the most stable analog signals is depicted in FIG. 8. An example of a waveform that does not produce the most stable analog signals is depicted in FIG. 5.

If a determination is made that the microcontroller will not output the waveform that produces the most stable analog signals, the process passes to block 612 which depicts outputting a single trinary pulse by cycling the TRIN pin 412 high once. Next, block 614 illustrates incrementing the PWM table pointer to point to the next value in the table.

Thereafter, block 616 depicts a determination of whether or not the pointer has reached the end of the table. If a determination is made that the pointer has not reached the end of the table, the process passes back to block 604. Referring again to block 616, if a determination is made that the pointer has reached the end of the table, the process terminates as illustrated by block 618 after having output each PWM voltage once. If PWM voltage outputs are to be output continuously, start block 600 would be re-entered.

Referring again to block 610, if a determination is made that the microcontroller will output the waveform that produces the most stable analog signals, the process passes to block 620 which depicts outputting a first trinary pulse by cycling the TRIN pin 412 high once. In this manner, a trinary pulse is inserted into the waveform. Next, block 622 illustrates resuming outputting the PWM signal for a sample/hold time period at the output cycle frequency. Each transition of the PWM signal from a low voltage level to a high voltage level is put on output PWM pin 402.

Thereafter, block 624 depicts ceasing the outputting of the PWM signal on the PWM pin 402. The process then passes to block 626 which illustrates outputting a second trinary pulse by cycling the TRIN pin 412 high once. This second trinary pulse is inserted into the waveform. The process then passes back to block 614.

Figure 7:
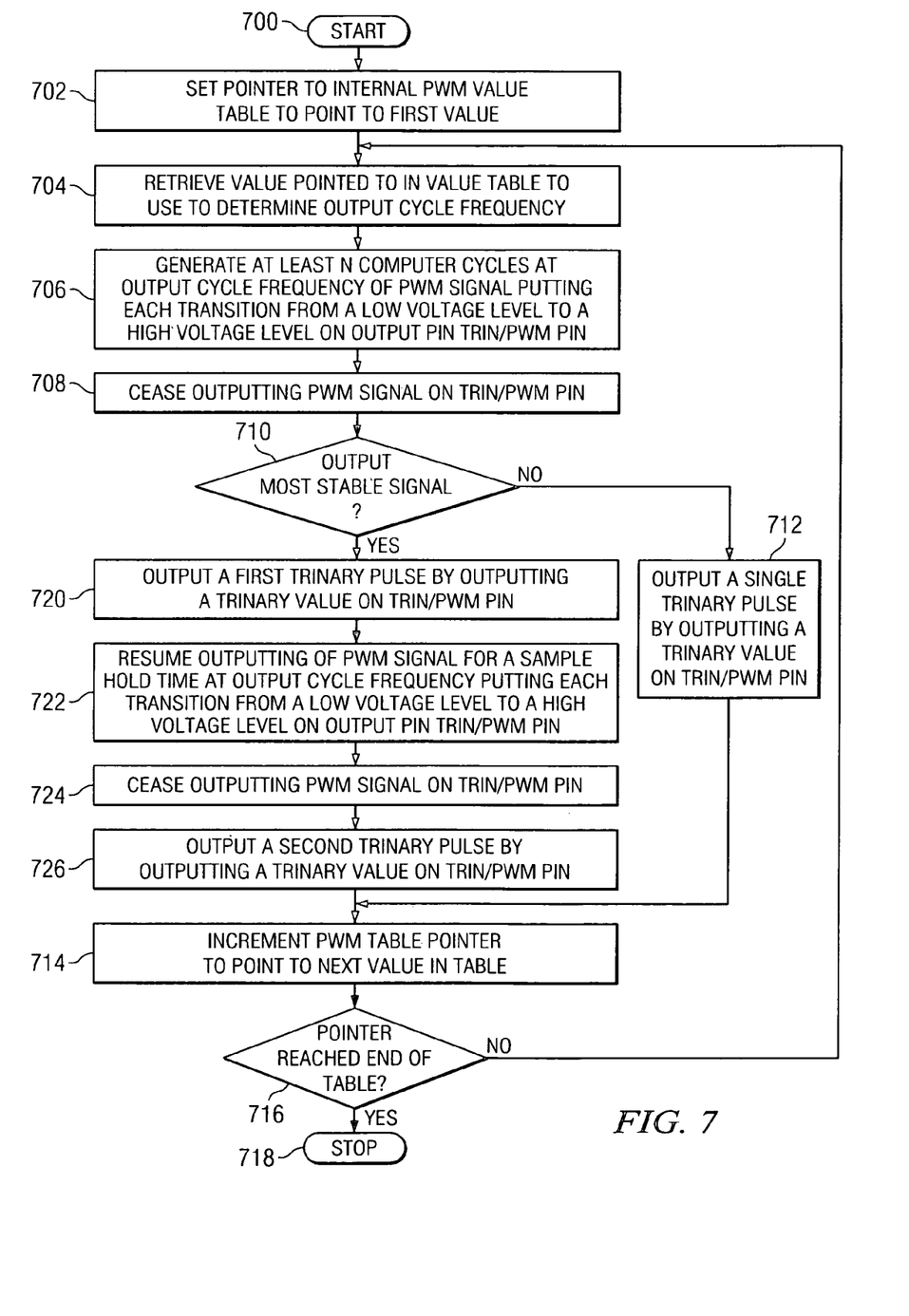
FIG. 7 depicts a high level flow chart that illustrates generating, by a microcontroller that can generate three different voltage levels on the same output pin, a waveform that includes a plurality of serially time-multiplexed digital PWM signals in accordance with the present invention.

FIG. 7 depicts a high level flow chart that illustrates generating, by a microcontroller that can generate three different voltage levels on the same output pin, a waveform that includes a plurality of serially time-multiplexed digital PWM signals in accordance with the present invention. The process starts as depicted by block 700 and thereafter passes to block 702 which illustrates setting a pointer to an internal PWM value table to point to the first value in the table. Next, block 704 depicts retrieving the value that is currently pointed to in the value table to use to determine the output cycle frequency of the next digital PWM signal to be generated by this microcontroller.

The process then passes to block 706 which illustrates generating at least N number of computer cycles of a digital PWM signal at the output cycle frequency retrieved from the PWM value table. Each transition of the PWM signal from a low voltage value to a high voltage value is put on output TRIN/PWM pin 302. Block 708, then, depicts ceasing outputting of the PWM signal on TRIN/PWM pin 302.

The process then passes to block 710 which illustrates a determination of whether or not to output the waveform that produces the most stable analog signals. If a determination is made that the microcontroller will not output the waveform that produces the most stable analog signals, the process passes to block 712 which depicts outputting a single trinary pulse by outputting a trinary pulse, i.e. a third voltage level, on TRIN/PWM pin 302. In this manner, a trinary pulse is inserted into the waveform. Next, block 714 illustrates incrementing the PWM table pointer to point to the next value in the table.

Thereafter, block 716 depicts a determination of whether or not the pointer has reached the end of the table. If a determination is made that the pointer has not reached the end of the table, the process passes back to block 704. Referring again to block 716, if a determination is made that the pointer has reached the end of the table, the process terminates as illustrated by block 718 having output each PWM voltage once. If PWM voltage outputs are to be output continuously, start block 700 would be re-entered.

Referring again to block 710, if a determination is made that the microcontroller will output the waveform that produces the most stable analog signals, the process passes to block 720 which depicts outputting a first trinary pulse by outputting a trinary value on TRIN/PWM pin 302. The first trinary pulse is inserted into the waveform. Next, block 722 illustrates resuming outputting the PWM signal for a sample/hold time period at the output cycle frequency. Each transition of the PWM signal from a low voltage level to a high voltage level is put on output TRIN/PWM pin 302.

Thereafter, block 724 depicts ceasing the outputting of the PWM signal on the TRIN/PWM pin 302. The process then passes to block 726 which illustrates outputting a second trinary pulse by outputting a trinary value on TRIN/PWM pin 302. The second trinary pulse is inserted into the waveform. The process then passes back to block 714.

FIG. 8 is a timing diagram of a waveform 800 that includes a plurality of serial time-multiplexed PWM signals where the waveform can be used to produce the most stable analog signals in accordance with the present invention. With the appropriate programming described herein, either microcontroller 300 and its TRIN/PWM pin 302 or microcontroller 400 and its TRIN pin 412, PWM pin 402, and transistor 414 can be used to generate the waveform depicted in FIG. 8.

Waveform 800 includes sequential digital PWM signals with multiple embedded trinary control pulses. The trinary control pulses serve to signal a beginning and end to a sample and hold time period before the beginning of a next PWM signal that is about to be presented.

Waveform 800 includes a first PWM signal 802, a second PWM signal 804, and a third PWM signal 806. A first trinary pulse is used to indicate the beginning of a sample/hold time period. A second trinary pulse is then used to indicate the end of that sample/hold time period at which time the new PWM signal will be presented.

For example, a sample/hold time period 808 is indicated by a first trinary pulse 810 and a second trinary pulse 812. Trinary pulse 812 also indicates that signal 804 is about to be presented.

A sample/hold time period 814 is indicated by a first trinary pulse 816 and a second trinary pulse 818. Trinary pulse 818 also indicates that signal 806 is about to be presented.

A sample/hold time period 820 is indicated by a first trinary pulse 822 and a second trinary pulse 824. Trinary pulse 824 also indicates that a fourth signal, not shown, is about to be presented.

Waveform 800 produces more stable analog voltage signals than waveform 500. It takes a while to integrate the waveform to produce an analog voltage. After a trinary pulse with no sample/hold time period, such as in FIG. 5, at the beginning of a next PWM signal in the waveform, there would be a momentary drop in voltage while the RC circuit ramps up. With waveform 500, there is a time where the analog voltage value varies slightly when transitioning from one PWM signal in the sequence to the next PWM signal in the sequence.

Figure 9:
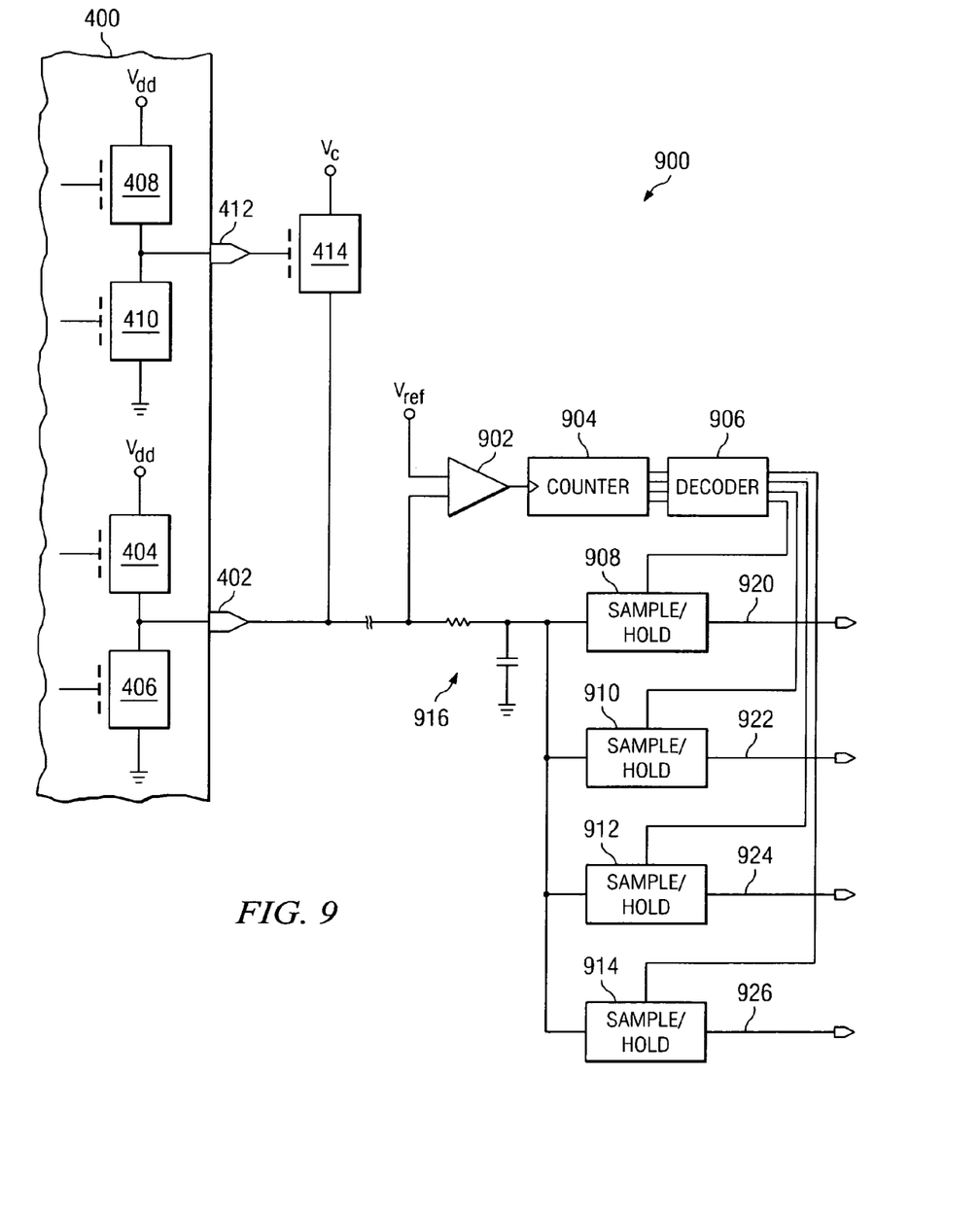
FIG. 9 is a block diagram of a portion of a microcontroller, which generates a waveform that includes a plurality of serially time-multiplexed PWM signals, and a first embodiment of an external decoder circuit that generates multiple analog signals from the waveform in accordance with the present invention.

FIG. 9 is a block diagram of a portion of a microcontroller, which generates a waveform that includes a plurality of serially time-multiplexed PWM signals, and a first embodiment of an external decoder circuit 900 that generates multiple analog signals from the waveform in accordance with the present invention. Although FIG. 9 includes the embodiment depicted in FIG. 4, the embodiment depicted in FIG. 3 could be used to generate the waveform that includes the time multiplexed plurality of digital PWM signals.

Circuit 900 includes a Schmidt Trigger comparator 902, a counter 904, a decoder 906, and a plurality of sample/hold circuits, such as sample/hold circuits 908, 910, 912, and 914.

Comparator 902 receives as one of its inputs a reference voltage, Vref. Comparator 902 receives, as its other input, the waveform 500 that is generated by either microcontroller 400 or microcontroller 300. The reference voltage, Vref, is chosen to provide noise margin while cleanly detecting voltages that are greater than Vdd and up to the trinary voltage, Vc. The trinary voltage Vc is greater than voltage Vdd. Comparator 902 provides its output as the input to counter 904. When voltages that are greater than Vdd are detected by comparator 902, counter 904 is clocked by comparator 902 causing counter 904 to advance to the next value. If counter 904 is currently set to its last value, when counter 904 is clocked again, counter 904 will reset back to its first value.

Counter 904 counts up to the number of separate digital PWM signals being serially time-multiplexed, and then resets back to its first value. Thus, in the depicted example, there are four separate digital PWM signals that are serially time-multiplexed in the waveform that is being generated by microcontroller 400. Because the waveform includes four separate PWM signals, there are four sample/hold circuits. Thus, four separate analog voltages will be generated. In addition, counter 904 will count to three before it resets back to zero.

The output of counter 904 is input into decoder 906. A different one of the outputs of decoder 906 controls each sample/hold circuit. Each sample/hold circuit receives at its input the waveform after it has been integrated by RC circuit 916. The output from the RC circuit 916 is an analog signal. The selected sample/hold circuit will provide the analog signal as its output.

In operation, the waveform that is output from microcontroller 400 is integrated by RC circuit 916 to produce an analog signal. The voltage level of the analog signal will depend on which one of the digital PWM signals is currently being output from microcontroller 400. The analog signal is then presented to each sample/hold circuit. When a trinary control pulse is detected by comparator 902, comparator 902 will generate an output to counter 904 that will cause counter 904 to advance. When counter 904 advances, its output encodes a signal on the counter's appropriate outputs. The signals that are output from counter 904 on its outputs cause decoder 906 to select the appropriate one of the sample/hold circuits.

In the example depicted by FIG. 9, there will be four serially multiplexed separate digital PWM signals in the waveform generated by microcontroller 400. Therefore, there are four sample/hold circuits. Counter 904 will count from 0-3 and provide four different encoded outputs, each one associated with one of the counts from 0-3. At the start of the output of the waveform, counter 904 is initially set equal to count 0. Thus, the encoded output from counter 904 which is associated with count 0 is active which causes decoder 906 to select sample/hold circuit 908. At this time, sample/hold circuit 908 is enabled while the remaining sample/hold circuits 910, 912, and 914 are disabled. Therefore, only sample/hold circuit 908 is refreshing its output 920. The other sample/hold circuits are holding their last respective output. Sample/hold circuit 908 provides as its output the analog signal it has received on its input. This analog signal was generated from the first PWM signal included in the waveform output from microcontroller 400.

The waveform includes the first PWM signal. This PWM signal is integrated by RC circuit 916 to produce a first analog signal representing a first voltage. This first analog signal is presented to each sample/hold circuit. Since only sample/hold circuit 908 is enabled, the first analog signal is output from sample/hold circuit 908 as signal 920.

When the microcontroller 400 is about to start generating a second PWM signal in its waveform, pin 412 is pulled high which causes transistor 414 to be pulled high to the Vc trinary voltage level. This inserts a trinary pulse in the waveform. When comparator 902 detects this trinary pulse, comparator 902 generates an output that causes counter 904 to be incremented. Thus, following the example from above, counter 904 is now at count 1. The outputs of counter 904 which were associated with count 0 change to represent an encoded count of 1. This results in decoder 906 deselecting its control output that is associated with sample/hold circuit 908 and selecting its control output that is associated with sample/hold circuit 910. At this time, sample/hold circuit 908 ceases sampling the analog voltage and sample/hold circuit 910 becomes enabled. At this time, sample/hold circuit 910 outputs the analog signal that is presented to its input which is the second PWM signal in the series in the waveform output from microcontroller 400.

After the trinary pulse is inserted into the waveform after the first PWM signal, microcontroller 400 begins outputting a second PWM signal. Thus, the waveform now includes the second PWM signal. This second PWM signal is integrated by RC circuit 916 to produce a second analog signal. Because only sample/hold circuit 910 is enabled now, the second analog signal is output from sample/hold circuit 910 as output 922.

This process continues with each trinary pulse included in the waveform indicating the beginning of a next PWM signal in the waveform. Each time a trinary pulse is detected in the waveform, decoder 906 cycles to the next sample/hold circuit. When the last sample/hold circuit is reached, the decoder then again selects sample/hold circuit 908 the next time a trinary pulse is received.

In this manner, in the depicted example, four separate analog signals are concurrently obtained from a single waveform that is generated by the microcontroller. The microcontroller is capable of generating these four separate analog signals using one output pin if microcontroller 300 is used or two output pins if microcontroller 400 is used.

Figure 10:
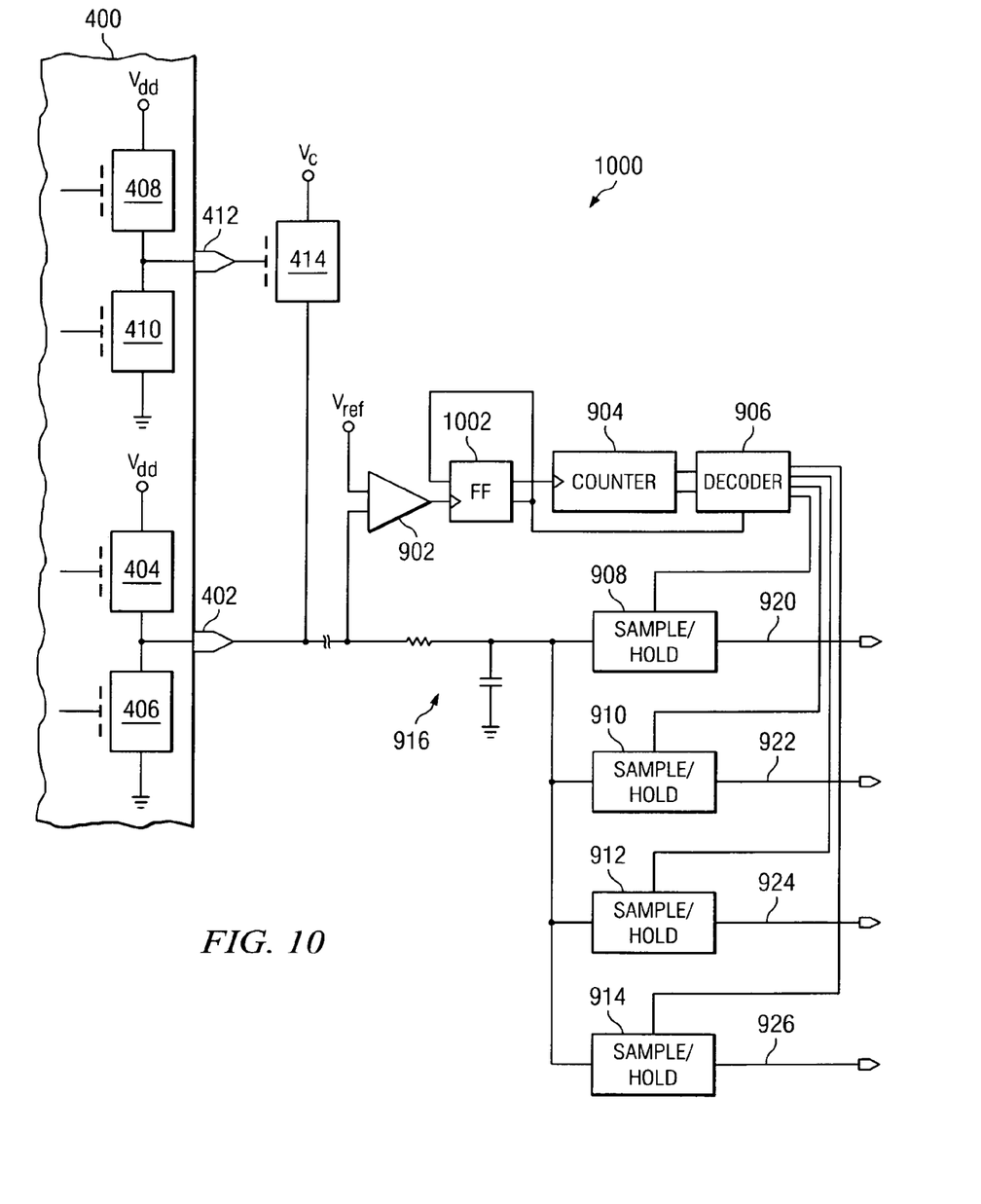
FIG. 10 is a block diagram of a portion of a microcontroller, which generates a waveform that includes a plurality of serially time-multiplexed PWM signals, and a second embodiment of an external decoder circuit that generates multiple analog signals from the waveform in accordance with the present invention.

FIG. 10 is a block diagram of a portion of a microcontroller, which generates a waveform that includes a plurality of serially time-multiplexed PWM signals, and a second embodiment of an external decoder circuit 1000 that generates multiple analog signals from the waveform in accordance with the present invention. Circuit 1000 is similar to circuit 900; however, the output from comparator 902 is now input into flip flop (FF) 1002 configured as a divide by two circuit. One output of flip flop 1002 is input into counter 904, and the output of flip flop 1002 is input into decoder 906. Circuit 1000 provides additional integration time between samples for best analog output stability. Circuit 1000 is. used when the most stable analog signal is required. In this case, microcontroller 400 outputs a first trinary signal that starts a sample/hold time period. After the sample/hold time period has elapsed, microcontroller 400 then outputs a second trinary signal. For example, see FIG. 8 and the timing diagrams of FIG. 11.

Figure 11:
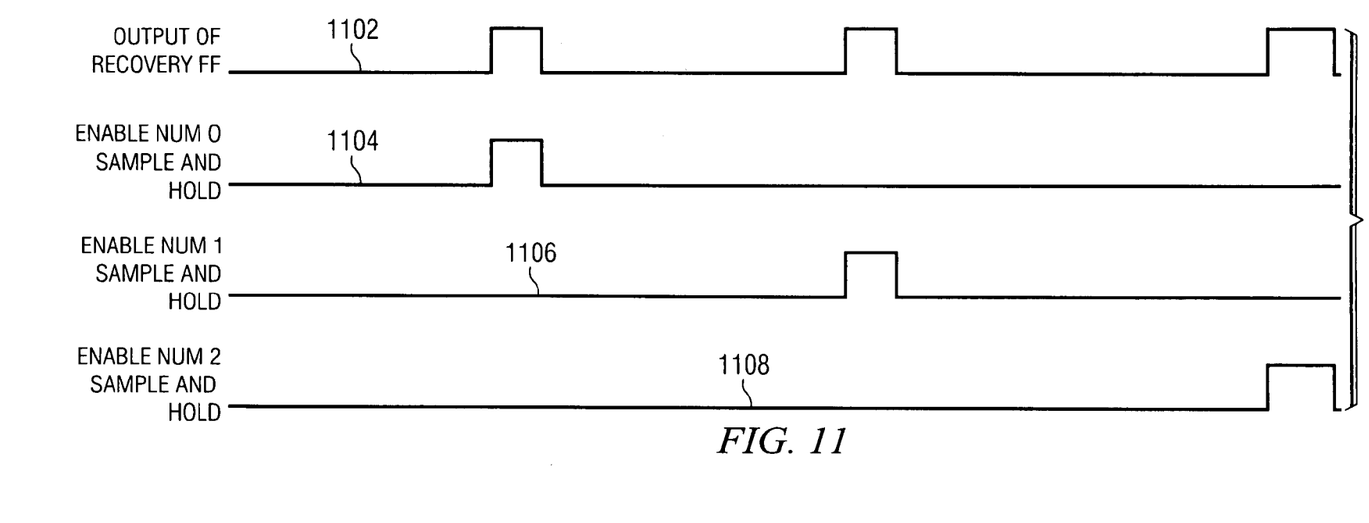
FIG. 11 depicts a timing diagram of signals when a second embodiment waveform is generated by the microcontroller in accordance with the present invention.

FIG. 11 depicts a timing diagram of signals when a second embodiment waveform is generated by the microcontroller in accordance with the present invention. FIG. 11 depicts the internal waveforms of the circuits shown in FIG. 10. As such, waveform 1102 depicts the output of the flip-flop 1002. Signal 1102 is combined with the decoded output of decoder 906 by selectively enabling the decoded outputs to enable each sample/hold circuit in turn. Waveform 1104 shows the sample/hold control signal presented to sample/hold circuit 908, while waveforms 1106 and 1108 show the sample/hold enable signal for sample/hold circuits 910 and 912 respectively.

The following is a description of a data processing environment which includes a microcontroller, also called a processor or microprocessor, in which the present invention can be implemented.

Figure 12:
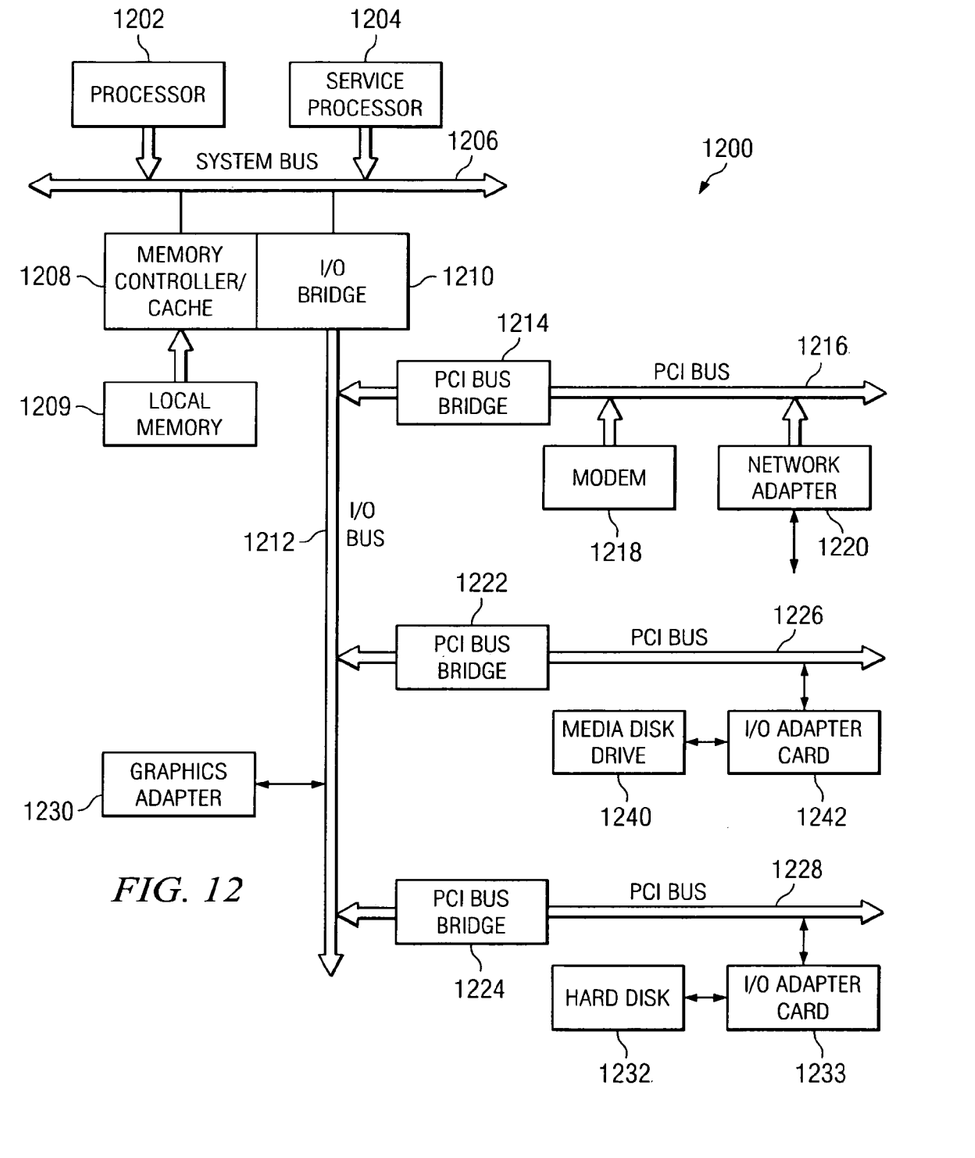
FIG. 12 is a block diagram of a computer system that includes the present invention in accordance with the present invention.

FIG. 12 is a block diagram of a computer system that includes the present invention in accordance with the present invention. Computer system 1200 may be a symmetric multiprocessor (SMP) system including a plurality of processors 1202 and 1204 connected to system bus 1206. Alternatively, a single processor system may be employed. In the depicted example, processor 1204 is a service processor. Also connected to system bus 1206 is memory controller/cache 1208, which provides an interface to local memory 1209. I/O bus bridge 1210 is connected to system bus 1206 and provides an interface to I/O bus 1212. Memory controller/cache 1208 and I/O bus bridge 1210 may be integrated as depicted.

Peripheral component interconnect (PCI) bus bridge 1214 connected to I/O bus 1212 provides an interface to PCI local bus 1216. A number of modems may be connected to PCI bus 1216. Typical PCI bus implementations will support four PCI expansion slots or add-in connectors. Communications links to other computers may be provided through modem 1218 and network adapter 1220 connected to PCI local bus 1216 through add-in boards.

Additional PCI bus bridges 1222 and 1224 provide interfaces for additional PCI buses 1226 and 1228, from which additional modems or network adapters may be supported. In this manner, data processing system 1200 allows connections to multiple network computers. A memory-mapped graphics adapter 1230 may also be connected to I/O bus 1212 as depicted, either directly or indirectly.

A storage device, such as hard drive 1232 is coupled to a PCI bus, such as bus 1228, via an I/O adapter card 1233. Hard drive 1232 may be implemented using any type of technology. For example, hard drive 1232 may be a SAS drive or may be a SCSI drive. Adapter card 1233 then maps PCI bus as either a SCSI bus or SAS bus depending on the type of interface technology supported by the hard drive 1232.

Another storage device, such as a digital media drive 1240, is included in system 1200. Digital media drive 1240 is coupled to PCI bus 1226 via an I/O adapter card 1242. Digital media drive 1240 may be utilized to read, i.e. play, data that is stored on digital storage media, such as a CD-ROM or a DVD-ROM, when that digital storage media is inserted into digital media drive 1240. Other types of digital storage media may be utilized in digital media drive 1240 to play the data that is stored in the digital storage media.

Those of ordinary skill in the art will appreciate that the hardware depicted in FIG. 12 may vary. For example, other peripheral devices, such as optical disk drives and the like, also may be used in addition to or in place of the hardware depicted. The depicted example is not meant to imply architectural limitations with respect to the present invention.

The invention can take the form of an entirely hardware embodiment, an entirely software embodiment or an embodiment containing both hardware and software elements. In a preferred embodiment, the invention is implemented in both hardware and software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method for generating, using a single microcontroller output pin, a waveform that is used to concurrently generate multiple separate analog signals, said method comprising:

outputting a waveform from said output pin, wherein the waveform comprises plurality of separate digital signals that are serially time multiplexed in said waveform, said plurality of separate digital signals being a plurality of separate digital pulse width modulated (PWM) signals;

outputting trinary signals from said output pin, wherein the trinary signals are inserted in said waveform to delineate each one of said plurality of digital signals from others of said plurality of digital signals;

utilizing said plurality of digital signals to concurrently generate a plurality of separate different analog signals, wherein said plurality of analog signals are generated by said microcontroller utilizing said single output pin;

decoding said waveform to obtain one of said plurality of digital signals; and responsive to a receipt of said one of said plurality of digital signals, generating a first analog signal by integrating a first one of said plurality of digital signals;

storing said first analog signal in a first storage device;

responsive to a detection of a first trinary signal, selecting a different one of said plurality of digital signals to use to generate an analog signal and receiving a second one of said plurality of digital signals;

generating a second analog signal by integrating the second one of said plurality of digital signals;

storing said second analog signal in a second storage device;

responsive to a detection of one of said trinary signals.

* * * * *